United States Patent [19]

Beard

[11] Patent Number: 5,019,937

[45] Date of Patent: May 28, 1991

[54] CIRCUIT IMPROVEMENT APPARATUS HAVING COMBINATION CURRENT LIMITING FUSE AND RESETTABLE VACUUM SWITCH TO PREVENT SINGLE-PHASING OF THREE-PHASE LOADS

[75] Inventor: Lloyd R. Beard, Centralia, Mo.

[73] Assignee: A. B. Chance Company, Centralia, Mo.

[21] Appl. No.: 429,152

[22] Filed: Oct. 30, 1989

[51] Int. Cl.[5] .................... H02H 3/08

[52] U.S. Cl. .................... 361/102; 361/104; 361/105

[58] Field of Search .................... 361/102, 58, 104, 93, 361/35, 41, 161, 63; 337/6

[56] References Cited

U.S. PATENT DOCUMENTS

| | | | |
|---|---|---|---|
| 3,863,187 | 1/1975 | Mahieu et al. | 337/162 |
| 3,987,340 | 10/1976 | Kussy | 361/104 X |
| 4,322,706 | 3/1982 | Thrash | 337/417 |
| 4,323,871 | 4/1982 | Kamp et al. | 337/7 |
| 4,413,246 | 11/1983 | Westrom et al. | 337/159 |
| 4,806,898 | 2/1989 | Osborne | 337/146 |

*Primary Examiner*—A. D. Pellinen
*Assistant Examiner*—Christopher Schultz
*Attorney, Agent, or Firm*—Hovey, Williams, Timmons & Collins

[57] ABSTRACT

A current interrupting apparatus adapted to be interposed in either a single or multiple phase electrical circuit includes a fuse interposed in each phase of the circuit. A current interrupter is electrically connected in series with each fuse for interrupting the current through the circuit, each current interrupter including a pair of normally closed electrical contacts and structure for opening the pair of contacts in response to a fault current of a magnitude different from the magnitude of current necessary to cause fusing of the fusible element of the fuse. A current interrupter triggering circuit is included in the apparatus for triggering operation of the contact opening structure of all of the current interrupters in response to fusing of the fusible element of any of the fuses to protect the circuit from the effects of single phasing. The current interrupter triggering circuit includes a solenoid electrically connected in parallel with each fuse and operable upon fusing of the fusible element of the fuse to trigger operation of the contact opening structure of all of the current interrupters.

10 Claims, 3 Drawing Sheets

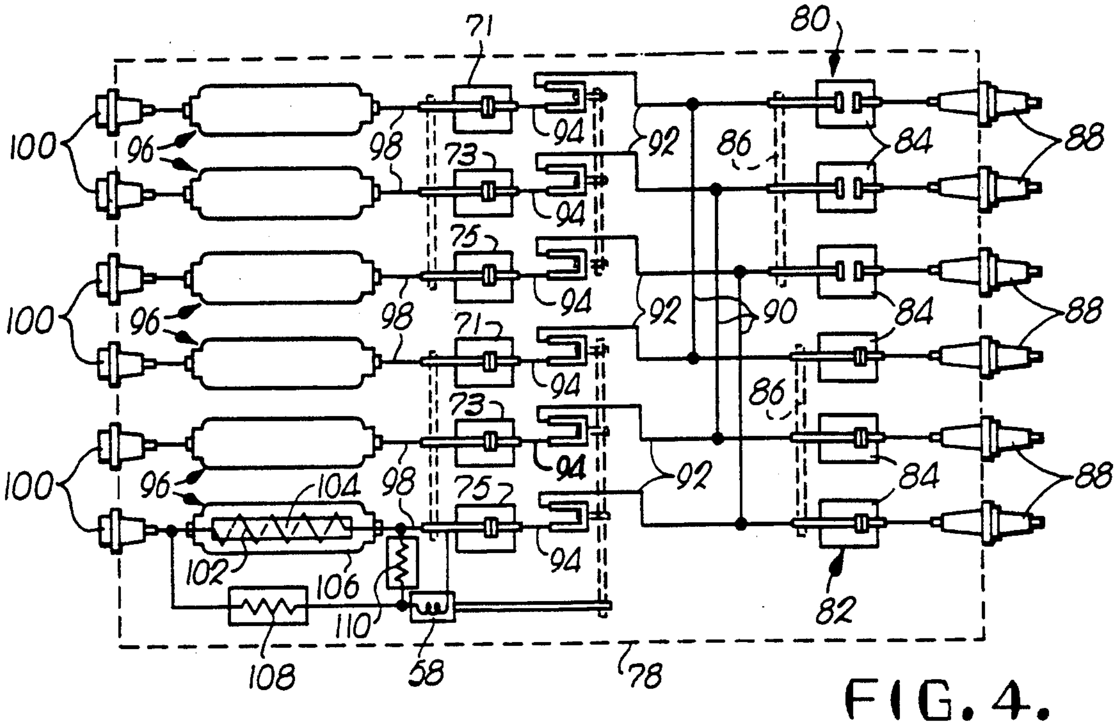
FIG. 4.
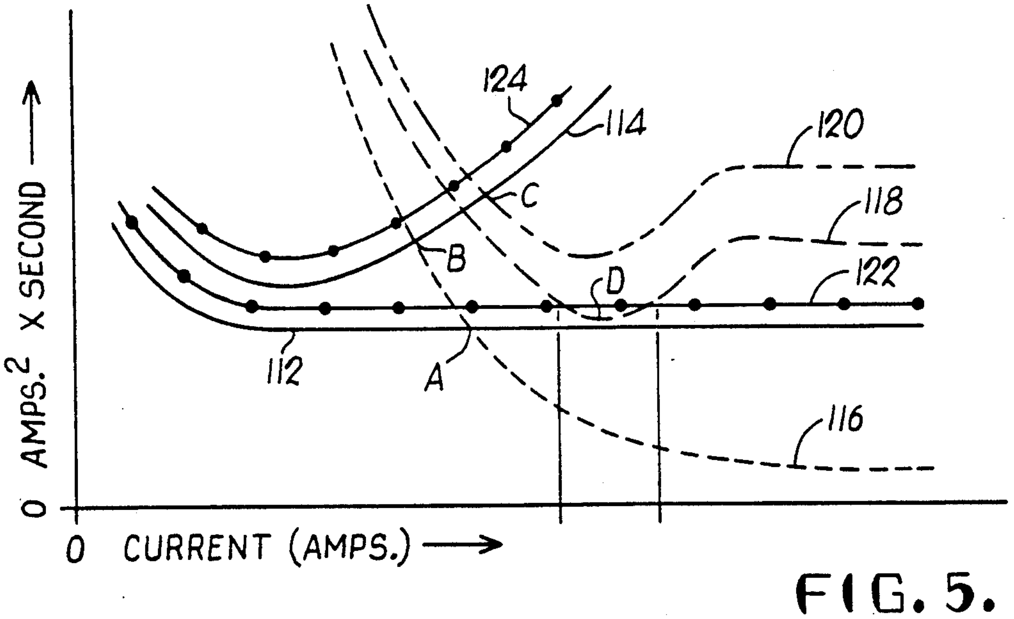
FIG. 5.
FIG. 6.
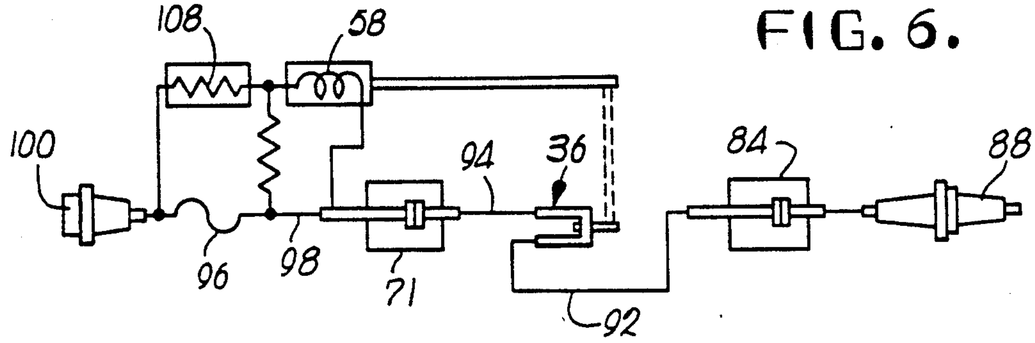

CIRCUIT IMPROVEMENT APPARATUS HAVING COMBINATION CURRENT LIMITING FUSE AND RESETTABLE VACUUM SWITCH TO PREVENT SINGLE-PHASING OF THREE-PHASE LOADS

BACKGROUND OF THE INVENTION

1. Field of the Invention

The present invention relates generally to electrical circuit fault indicators and, more particularly, to an indicator apparatus for use in an electrical circuit including a fusible element which fuses in response to a fault current of a predetermined magnitude experienced by the circuit, as well as to a current interrupting apparatus adapted to be interposed in a multiple phase electrical circuit and operable to prevent single phasing of the circuit upon the occurrence of a fault in one of the phases.

2. Discussion of the Prior Art

It is known to provide a current-responsive, resettable, violence-free low fault range vacuum-type switch interrupter in series connection with a high fault range current limiting fuse (CLF) to form a circuit protecting device adapted for use in padmounted, oil-filled switch gear and the like. Such an apparatus is disclosed in U.S. Pat. No. 4,323,871, to Kamp et al., which disclosure is incorporated herein by this express reference.

In U.S. Pat. No. 4,323,871, the circuit protecting apparatus is disclosed as including a vacuum contact assembly having bottle or other means defining a substantially evacuated chamber, with a pair of normally closed electrical contacts within the chamber. At least one of the electrical contacts is shiftable for opening and closing of the contact pair to alternately interrupt and establish a current path therethrough. A mechanism is operably coupled to the contact assembly for opening the contact pair when a fault of predetermined magnitude is experienced by the interrupter-protected circuit. The mechanism includes a spring biased, over center toggle motive assembly operably coupled to a shiftable contact shaft, along with a latching element electrically interposed in the circuit and serving to hold the motive assembly in the releasable, biased, cocked position thereof. The latching element is disclosed as including a current-responsive, temperature sensitive bimetallic element which is constructed for heating when it experiences a fault current and, in response to and as a direct result of such heating, for changing its physical configuration for unlatching purposes.

In addition to fault-induced tripping of the switch interrupter of the apparatus disclosed in U.S. Pat. No. 4,323,871, structure is also provided in the patented apparatus for selective manual opening and closing of the vacuum contact pair. This structure includes an appropriate external operating handle, and the latter can also be employed to reset the vacuum contacts when the latter have been opened either manually or in response to a fault current. Further, the vacuum switch interrupter is disclosed as being designed for series connection with a current limiting fuse. Such a CLF is of conventional construction and includes a housing and a silver fusible element within the housing which is designed to fuse in response to a relatively high magnitude fault current. A suitable CLF is disclosed in U.S. Pat. No. 3,863,187, which patent is incorporated into the present disclosure by this express reference.

In three phase circuits wherein respective vacuum interrupters in accordance with U.S. Pat. No. 4,323,871 are interposed in the separate phase lines, a mechanical connection in the form of elongated rods between separate switch interrupters and operably coupled to the motive assemblies thereof is disclosed for gang operation of the switch interrupters. Thus, when one phase conductor experiences a fault sufficient to actuate the associated switch interrupter, the remaining switch interrupters are likewise actuated. This prevents a situation where one or more of the phase conductors remain energized in the event of a fault in another phase conductor.

By providing the disclosed construction, it was an object of the patented apparatus to cooperatively design the CLF and vacuum switch interrupter such that the switch interrupter would operate upon experiencing the let through current resulting from operation of the current limiting fuse. In this manner the switch interrupter was arranged to always operate in response to operation of the current limiting fuse.

However, one problem found to exist in the known apparatus discussed above is raised by the variation in the operating characteristics of the current-responsive, temperature sensitive bimetallic element which occur during changes in certain ambient conditions. Specifically, it has been found that even when a vacuum contact assembly and a current limiting fuse are properly coordinated for operation within a given range of current and voltage conditions, the current required to cause a change in the physical configuration of the bimetallic element varies with changes in the ambient temperature of the insulating oil surrounding the bimetallic element.

OBJECTS AND SUMMARY OF THE INVENTION

It is an object of the present invention to provide a system, including a vacuum contact assembly in series connection with a current limiting fuse, and a sensing and triggering circuit arranged in parallel with the current limiting fuse which senses fusing of the CLF and, in response thereto, triggers operation of the vacuum contact assembly even where the bimetallic element has not unlatched the contact assembly due to ambient temperature conditions.

In accordance with this and other objects, the inventive current interrupting apparatus includes a current limiting fuse interposed in each phase of a multiple phase circuit and provided with a sealed housing and a fusible element within the housing which fuses in response to a fault current of a first predetermined magnitude experienced by the circuit, the housing including structure for retaining the energy of interruption within the housing upon fusing of the fusible element. A current interrupting means is electrically connected in series with each current limiting fuse for interrupting the current through the circuit, each current interrupter means including a pair of normally closed electrical contacts and a mechanism for opening the contacts in response to a fault current of a second predetermined magnitude different from the first predetermined magnitude. A current interrupter triggering means is also provided for triggering operation of the mechanisms of all of the current interrupting means in response to fusing of the fusible element of one of the current limiting fuses to protect the circuit from the effects of a fault current in one of the phases. The current interrupter triggering means includes a solenoid electrically connected in parallel with each of the current limiting fuses and means for operably connecting each solenoid to all of the mechanisms.

In its broadest sense, the invention relates to a fault indicator apparatus adapted to be interposed in an electrical circuit including a fusible element which fuses in response to a fault current of a predetermined magnitude experienced by the circuit. The apparatus comprises indicator means for indicating the condition of the fusible element, the indicator means including a solenoid electrically connected in parallel with the fusible element to be energized upon fusing of the fusible element to cause an indication to be made that a fault current has been experienced.

When employed in a single phase circuit, the current interrupting apparatus of the invention includes, among other .features, triggering means for triggering the opening of a pair of normally closed contacts of a current interrupter in response to fusing of the fusible element of a fuse that is also provided in the circuit. In this manner, the circuit is protected from the effects of a fault current in the circuit. In this embodiment of the triggering means, a triggering circuit is provided which includes a solenoid electrically connected in parallel with the fuse and operable upon melting of the fuse to trigger operation of the opening means of the current interrupter.

BRIEF DESCRIPTION OF THE DRAWING FIGURES

A preferred embodiment of the invention is described in detail below with reference to the attached drawing figures, wherein:

FIG. 4 is a schematic plan view illustrating the electrical connection between the coordinated full range protective device of the present invention and conventional switch gear in a three-phase, padmounted, oil-filled circuit distribution device;

FIG. 5 is a graphical representation of typical fault-clearing responses of the full range coordinated protective device of the invention;

FIG. 6 is a schematic plan view illustrating the electrical connection between a single protective device of the present invention and one phase of a multiple-phase circuit distribution device;

DETAILED DESCRIPTION OF THE PREFERRED EMBODIMENT

Figure 1:
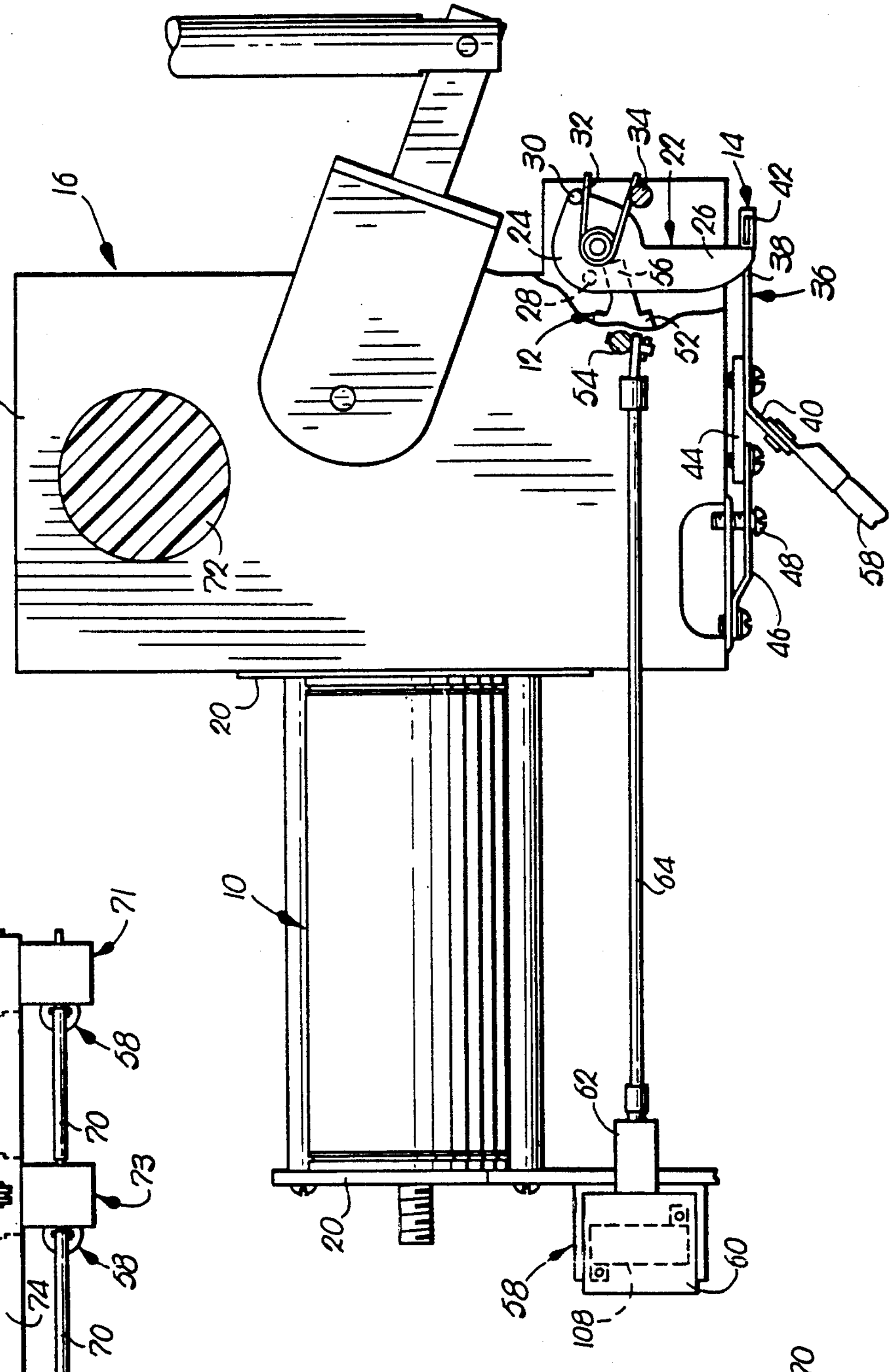
FIG. 1 is a longitudinal elevation view, partially cut away, of a resettable vacuum switch interrupter operating mechanism, shown in the switch closed position thereof.

As illustrated in FIG. 1, a preferred embodiment of the invention is illustrated for use with a resettable vacuum switch interrupter which broadly includes a vacuum contact assembly 10, a contact operating assembly 12 and a latching assembly 14, all housed within and supported by mounting structure 16 that is designed to support the overall interrupter in a dielectric filled tank.

The mounting structure 16 includes a pair of side plates 18 with opposed end plates attached therebetween, and a pair of opposed contact assembly mounting plates 20 are secured to one of the end plates. The vacuum contact assembly 10 is of conventional construction and includes a pair of metallic electric contacts supported on separate copper shafts within an evacuated internal chamber for movement into and out of engagement with one another during opening and closing operations of the contact assembly.

The operating assembly 12 is mounted within the mounting structure 16 and includes means for opening and closing the contacts under predetermined operating conditions in the interrupter. An integral, synthetic resin cam member 22 forms a part of the assembly and includes a rounded main body portion 24 and a depending, elongated leg 26. A stud 28 projects from the upper end of the leg 26 and a spring-engaging projection 30 extends from the face of the portion 24 remote from the stud 28.

The cam member 22 is further biased for counterclockwise movement thereof, as viewed in FIG. 1, through the medium of a torsion spring 32. The legs of the spring are in engagement with a spacer 34 extending between and coupled to the side plates 18 of the mounting assembly 16 and to the projection 30.

A hammer latch release plate 52 is mounted on an axially rotatable shaft 54 for movement therewith and includes an extending arm 56 projecting beneath the stud 28 so that, upon rotation of the cam member 22, the latch release plate 52 is rotated in the clockwise direction and initiates operation of the contact operating assembly 12 to move the contacts to an open position.

The latching assembly 14 is preferably in the form of a substantially U-shaped bimetallic element 36 having spaced apart legs 38 and angularly oriented connector portions 40 associated therewith. A brass reinforcement 42 is crimped about the bight portion of the element and engages the leading edge of the cam member leg 26, in order to hold the latter in its cocked position illustrated in FIG. 1. The bimetallic element 36 is of known construction and includes at least two layers of metallic material having dissimilar coefficients of thermal expansion. Therefore, upon experiencing a rise in temperature, the bimetallic element will deform in an entirely predictable manner in order to unlatch the cam member 22 and permit pivoting thereof in a counter clockwise manner so as to actuate the entire operating assembly 12 in order to open the contacts.

The bimetallic element 36 is secured to an insulating plate 44 by means of mounting screws. The plate is in turn secured to and supported by a cantilever spring 46 secured to the plate by means of screws and an adjustment screw 48. Connection between the cantilever spring and the plate is effected through the use of additional screws.

An electrical braid 50 is operatively secured to the connector portion 40 of the leg 38 and to associated electrical connections to the element 36 are preferably on the high expansion side thereof in order to keep heat-up time to a minimum and lower response time of the operating assembly 12.

Triggering means are provided on the interrupter for triggering operation of the contact operating assembly 12 when a current limiting fuse that is connected in series with the interrupter beats out the latching assembly 14 by melting prior to unlatching of the cam member 22. The triggering means is provided for ensuring that the operating assembly 12 opens the contacts upon fusing of the CLF even under conditions where the latching assembly fails to operate for any reason.

Figure 3:
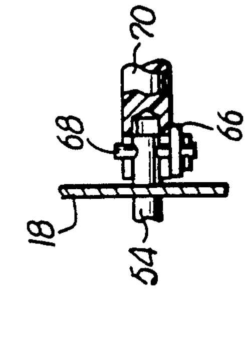
FIG. 3 is an enlarged fragmentary view illustrating the gang connection between two switch interrupters.

The triggering means includes a solenoid 58 mounted on one of the contact assembly mounting plates 20. The solenoid is provided with a winding or coil portion 60 and a plunger 62 extending axially through the winding portion in a direction parallel with the axial direction of the winding portion in a direction parallel with the axial direction of the contact assembly 10. The plunger 62 is connected to an elongated rod 64 which is linked to the rotatable shaft 54 on which the hammer latch release plate 52 is mounted. As shown in detail in FIG. 3, the elongated rod 64 includes a flattened end portion 66 having an oversized hole passing therethrough for receiving a pin 68 that extends in the radial direction of the shaft 54. A linkage rod 70 is received axially on the shaft 54 and is also keyed to the shaft by the pin 68 so as to be rotatable with the shaft. The function of the linkage rod is discussed more fully below.

The interrupter can be used in either single or multiple phase contexts. In a single phase situation, the interrupter may be disposed in a switchgear or like apparatus, and supported by means of an elongated insulating rod 72 which extends through appropriate apertures in the side plates 18.

Figure 2:
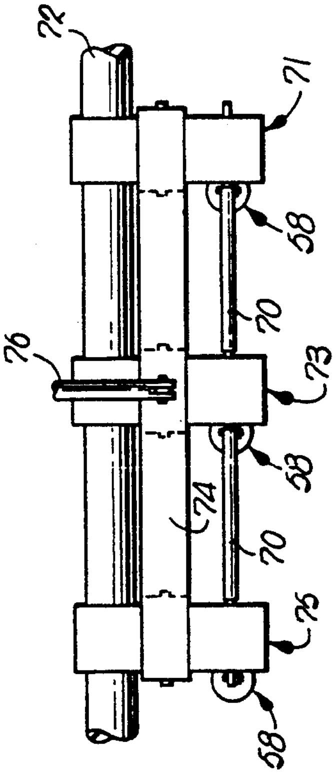
FIG. 2 is a schematic plan view of three ganged switch interrupters for use in protecting a three-phase distribution circuit.

As shown in FIG. 2, in three phase circuits, separate interrupters 71, 73, 75 are provided for each phase conductor. In such a case, the respective interrupters are supported on an insulated rod 72 in spaced relationship to one another. In addition, in order to gang the respective interrupters for substantially simultaneous operation in both a manual opening and closing sequence, and in fault-induced operation, the respective operating arms of the interrupters are operatively connected by means of an elongated link 74, and an operating handle 76 is secured to the central interrupter. The handle 76 passes through a surrounding wall of an enclosure housing the interrupters, and is movable for manual opening and closing of the interrupters in unison. Further, a pair of linkage rods 70, as discussed above, are respectively operatively coupled between the three interrupters 71, 73, 75 for gang operation of the operating assemblies thereof in a fault situation. Specifically, each linkage rod 70 is operatively secured to apertured ends of the shafts 54 of adjacent interrupters by means of the pins 68 so that the respective shaft 54 will rotate essentially in unison upon rotation of any one of the shafts.

The solenoid 58 of each of the interrupters is connected to the shaft 54 of that interrupter at a position adjacent the side plate thereof in order to permit rotation of all of the shafts 54 in response to actuation of one of the solenoids.

Referring to FIG. 4, a schematic illustration of a preferred switchgear apparatus in accordance with the invention is shown. The apparatus is of the padmounted variety, but it is understood that the apparatus can be used in a wide variety of contexts, e.g., on pole-mounted equipment and/or in conjunction with transformers and other transmission and distribution devices. The apparatus includes a conventional enclosing tank 78 adapted to hold a supply of fluid dielectric material such a oil, and provided with an openable, normally locked door (not shown). Two banks of primary vacuum switches 80, 82 are disposed within the tank and each includes three separate phase line vacuum switches 84 of identical construction and operational characteristics. The three switches in each bank are operatively coupled for gang operation thereof by means of appropriate links 86 of known construction. Six primary line bushings 88 extend through one end wall of the tank and are respectively operatively coupled in series to the phase line switches.

The load sides of the respective switches 84 are in turn electrically coupled in series with corresponding interrupters 71, 73, 75 in accordance with the invention, and the usual buss conductors 90 are connected between corresponding pairs of switch elements in each bank. Specifically, braids 92 are employed to connect the load side of each of the switches 84 to one leg of the bimetallic element 36 of the corresponding interrupter, and the remaining leg of the element 36 is connected via an additional braid 94 into the phase circuit to complete the current paths through the interrupters.

The ends of the stationary shafts of the interrupters 71, 73, 75 are electrically connected to corresponding current limiting fuses 96 via lines 98, and the load sides of the current limiting fuses are, in turn, coupled to corresponding tap line bushings 100 which extend through a wall of the tank 78 remote from the primary line bushings 88.

Each current limiting fuse 96 is preferably of the high range variety and is of the type disclosed in referenced U.S. Pat. No. 3,863,187. In general, each fuse includes an elongated silver fusible element 102 spirally wound about a lightweight, finned synthetic resin saddle member 104 and disposed with a sealed housing 106 along with pulverulent arc-suppressing silica sand. In addition, the internal fuse assembly is encapsulated within a conventional synthetic resin encapsulant for ensuring that the current limiting fuse is air-and oil-tight. The actions of the current limiting fuse 96 are silent and substantially non-venting as all of the energy of interruption is retained within the sealed housing 106 thereof.

The construction of the current limiting fuses 96 is illustrated in FIG. 4, with reference to the lowermost fuse. In addition, the triggering means is also illustrated in connection with only the lowermost interrupter and current limiting fuse 96. It is noted however, that substantially identical triggering means are provided on each of the interrupters 71, 73, 75 when a multiple phase system is employed.

As shown in FIGS. 4 and 6, the triggering means of the present invention, which in the preferred embodiment of the invention serves as a protective device for preventing single phasing of a multi-phase circuit distribution system, includes the solenoid 58 connected in parallel with the current limiting fuse 96. A power resistor 108 is also provided in parallel with the current limiting fuse 96 in series with the solenoid 58 for preventing actuation of the solenoid during normal operation of the circuit below the fusing conditions of the CLF 96, and for reducing the current reaching the solenoid upon fusing of the CLF. A buffer resistor 110 is also provided in the circuit for dividing the voltage through the parallel circuit upon fusing of the CLF in order to prevent too much voltage from passing across the coil.

In the preferred embodiment of the invention, the current limiting fuses 96 are designed to be coordinated with the interrupters 71, 73, 75. In other words, each interrupter is especially designed to actuate when a relatively low level fault current is experienced, whereas the current limiting fuses 96 are designed to actuate in a relatively rare occurrence of high level faults. Further, in order to increase the protective function, the interrupters 71, 73, 75 should be designed to activate upon experiencing the characteristic let through current associated with the operation of the series-related current limiting fuse.

With specific reference to FIG. 6, the triggering means of the present invention is shown in connection with a single phase of a circuit. Where the circuit comprises only one phase, the triggering means is functional in dividing the voltage in the circuit so as to reduce the voltage stress experienced by the blown CLF. Thus, in addition to providing an indication that the CLF has blown, an additional circuit-protection benefit is realized through the use of the triggering means.

Referring to FIG. 5, a qualitative graphical representation of the $I^2t$ versus current curves for the interrupter-CLF protective device in accordance with the invention is illustrated. In this graph, branched curve 112 is the minimum trip curve for the interrupter for a first given ambient temperature (which represents the minimum energy needed to raise the bimetallic element to its trip temperature), and the curve 114 is the total clearing curve for the interrupter for the same first ambient temperature (maximum energy experienced before the interrupter clears the fault). The curve 116 is the minimum melt curve for the CLF whereas the curve 118 is the minimum clear curve for the CLF, and curve 120 is the total clearing curve for the CLF. The coordination of the interrupter and CLF is indicated by the crossover points labeled A–D. For example, any time the $I^2t$ value exceeds that necessary to heat the bimetallic element to its tripping temperature, the interrupter will trip to open the circuit. This normally occurs when the $I^2t$ value is above curve 112. If the $I^2t$ is less than the minimum melt of the CLF then only the interrupter will operate. Between points B and C is an area of uncertainty where the interrupter will always open and the CLF may blow. To the right of point C and above the curve 112, the interrupter and the CLF will both always open.

Thus, under ambient conditions indicated by the curves 112, 114, the operation of the circuit is as follows:

1) Below and to the left of point B the interrupter only will operate and thus clear faults of relatively low magnitude, and the CLF will not blow;

2) At $I^2t$ values above point C, the CLF will operate and clear the circuit before the interrupter contacts open. Currents above point C are beyond the interrupting capacity of the interrupter; and 3) Inasmuch as the minimum total clearing curve for the CLF is above the minimum trip curve for the interrupter, the latter will operate in response to experiencing the characteristic let through current of the CLF.

However, as mentioned above, the bimetallic element 36 does not always operate in accordance with the curves 112, 114 shown in the graph of FIG. 5, but may be effected by ambient temperature changes such as those normally encountered during seasonal swings in temperate climates. For example, curve 122 represents the minimum trip curve for the interrupter for a second ambient temperature less than the temperature represented by curve 112 by an amount typical of a seasonal swing of approximately 60 degrees Celsius. In addition, the curve 124 is the total clearing curve for the interrupter for the same second ambient temperature.

As can be seen from a comparison of curves 122, 124 with curves 112, 114, it is possible that the minimum clear curve 118 of the CLF will drop beneath the minimum trip curve for the interrupter such that the energy required to raise the bimetallic element 36 to its trip temperature is greater than the energy required to cause clearing of the fusible element of the CLF. Thus, absent the triggering means of the present invention, it would be possible for the CLF to operate and beat out the bimetallic elements 36 such that the contacts would remain closed.

Such an occurrence in a three phase distribution system would result in single phasing of the three phase connected load causing harmful overcurrents in the two remaining closed phases. However, because of the provision of the triggering means of the invention, the operating assemblies of all of the interrupters are operated in response to the fusing of any one of the current limiting fuses, even where none of the bimetallic elements have been heated to a temperature sufficient to actuate one of the latching assemblies.

The various methods of operating the interrupter will now be described. Because manual opening and closing of the resettable vacuum switch is carried out in substantially the same manner as in the referenced U.S. Pat. No. 4,323,871, this type of operation is not further discussed herein.

Fault induced operation of the interrupter is identical to fault induced operation of the interrupter of the above-referenced patent when the ambient temperature surrounding the bimetallic element is such that the melting characteristics of the element 36 are as shown in curves 112, 114 of the FIG. 5, with the minimum trip curve located beneath the minimum clear curve for the CLF. However, where the ambient temperature decreases to a level sufficient to bring the minimum trip curve of the interrupter above the minimum clear curve of the CLF, then the bimetallic element 36 does not operate prior to operation of the CLF and opening of the contacts of the interrupter is actuated by the triggering means.

Specifically, upon melting of the fusible element of the CLF, a small current flows through the parallel circuit including the power resistor 108, solenoid 58 and buffer resistor 110. This current flow causes actuation of the solenoid 58 such that the plunger 62 moves axially through the coil portion 60 pulling the, elongated rod 64 in a direction away from the shaft 54, as shown in FIG. 1. By this movement of the elongated rod 64, the shaft 54 is rotated in the clockwise direction, thus causing operation of the operating assembly and opening of the contacts. In a three phase system, due to the interconnection of the shafts 54 by the linkage rods 70, operation of one of the solenoids 58 causes rotation of all of the shafts such that the operating assemblies 12 of all of the interrupters 71, 73, 75 are operated to open the contacts.

After a fault current has been cleared, and the parallel current path is broken by the interrupter, the plunger 62 of the actuated solenoid 58 returns to its normal unactuated position, upon reset of the operating assembly, leaving the elongated rod 64 in an extended orientation relative to the shaft 54 such that the hammer latch release plate 52 is permitted to return to the latched position thereof. Further, to reset the interrupters, a handle 76 provided on the interrupters is manipulated to manually move the contacts to a closed position and to 5 reset the operating assemblies in a manner consistent with the disclosure of the referenced U.S. Pat. No. 4,323,871.

Thus, in a three phase system, when a fault current is experienced in one phase which is of sufficient magnitude to cause operation of the current limiting fuse 96 associated with that phase, operation of all of the interrupters 71, 73, 75 is reliably carried out by the triggering means without requiring replacement of any system components other than the melted current limiting fuse itself. The triggering means is completely reusable since the resistors 108, 110 and solenoid 58 form a parallel circuit with the CLF which is activated only upon fusing of the CLF. In addition, if only one of the current limiting fuses melts during the fault current flow, then the remaining current limiting fuses are reusable after making a simple resistance check.

Figure 7:
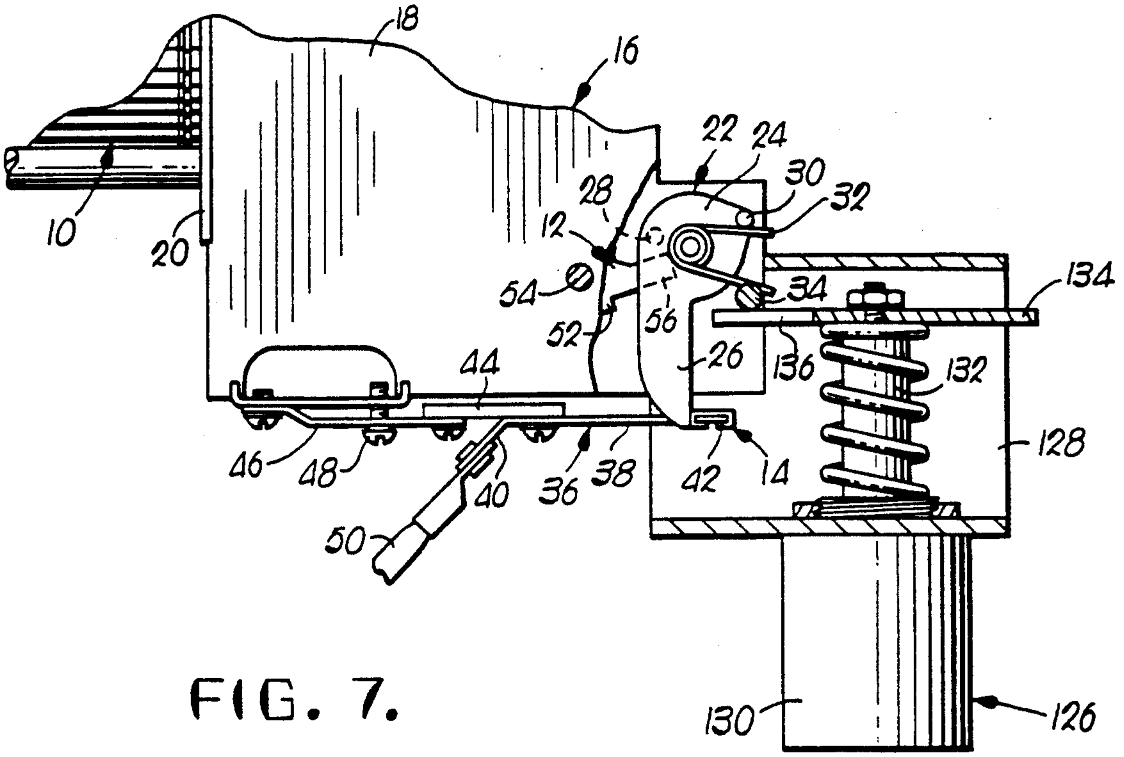
FIG. 7 is a partial longitudinal elevation view, partially cut away, of a resettable vacuum switch interrupter operating mechanism, shown in the switch closed position.
Figure 8:
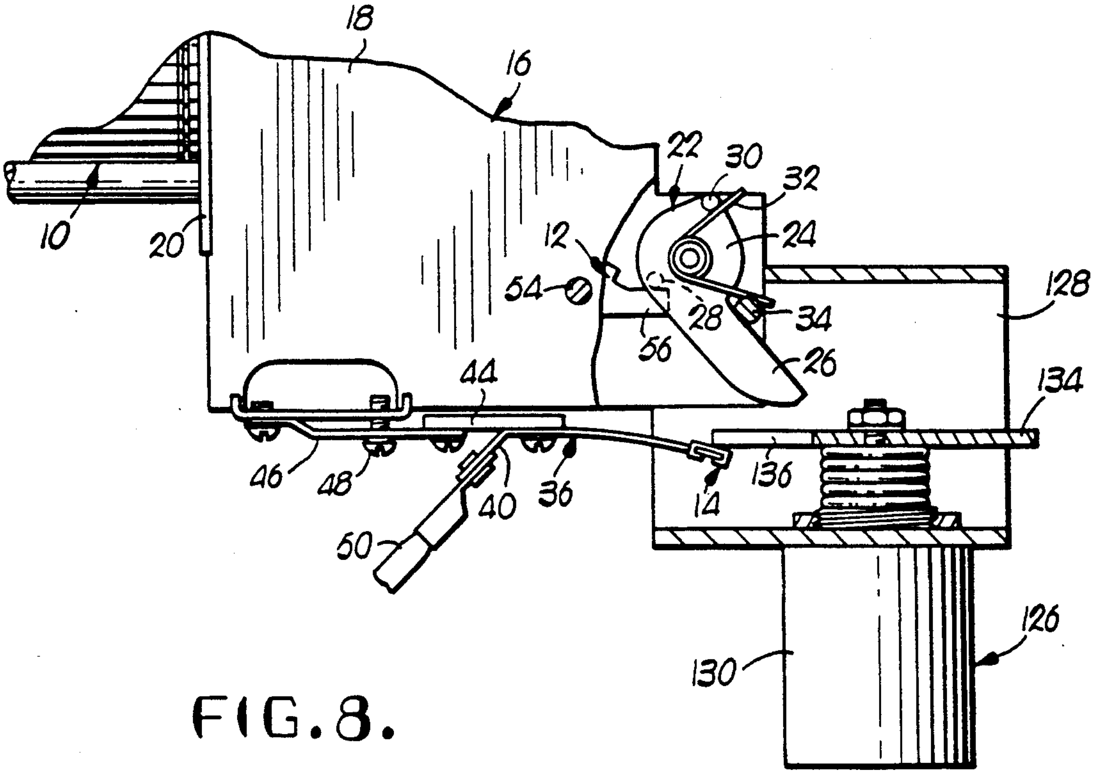
FIG. 8 is a partial longitudinal elevation view, partially cut away, of a resettable vacuum switch interrupter operating mechanism, shown in the switch open position.

An alternate construction of the triggering means of the preferred embodiment of the invention is illustrated in FIGS. 7 and 8. As shown in FIG. 7, the alternate construction includes a solenoid 126 mounted to the side plates of the interrupter adjacent the location where the extending leg 26 of the cam member 22 is received in the latching assembly.

The solenoid 126 includes a winding or coil portion 130 secured to the bracket 128 and a plunger 132 axially received in the coil portion and movable relative thereto in a direction substantially parallel to the direction in which the bimetallic element 36 travels when releasing its hold on the cam member 22. A contact plate 134 is mounted to the end of the plunger 132 remote from the coil portion 130 and moves with the plunger during actuation of the solenoid.

As illustrated in FIG. 8, the contact plate 134 is sized to engage the bimetallic element 36 during movement of the plunger between its unactuated and actuated positions, and includes a narrow slot 136 oriented to permit passage of the leg of the cam member 22 once the cam member is released from the latching assembly. After the parallel current path has been broken by the interrupter, the plunger 132 and bimetallic element 36 return to the positions shown in FIG. 7 and the interrupter is manually reset to the contact closed position.

Although the invention has been described with reference to the preferred embodiment illustrated in the drawing figures, it is noted that substitutions may be made and equivalents employed herein without departing from the scope of the invention as set forth in the claims.

For example, although the preferred embodiment discussed above relates to the use of a protective device in single and three phase distribution systems, it is possible to employ the present invention as a reusable indicating means for indicating when a current limiting fuse in a circuit has melted. Thus, in an automated system, the circuit of the triggering means could be connected to a remote transponder unit or the like which would be used to control the distribution system. Also, the circuit could be connected directly to other circuit breaking means which would protect the system from overcurrent conditions upon melting of the current limiting fuse connected in parallel with the circuit of the triggering means.

What is claimed is:

1. A current interrupting apparatus adapted to be interposed in a multiple phase electrical circuit, the apparatus comprising:

a fuse interposed in each phase of the circuit and including a fusible element which fuses in response to a fault current of a first predetermined magnitude experienced by the circuit;

a current interrupter electrically connected in series with each fuse for interrupting the current through the circuit, each current interrupter including a pair of normally closed electrical contacts and opening means for opening the pair of contacts in response to a fault current of a second predetermined magnitude different from the first predetermined magnitude; and current interrupter triggering means for triggering operation of the opening means of all of the current interrupters in response to fusing of the fusible element of any of the fuses to protect the circuit from the effects of single phasing, the current interrupter triggering means including a triggering circuit with a solenoid electrically connected in parallel with each fuse and operable upon fusing of the fusible element of the fuse to trigger operation of the opening means of all of the current interrupters.

2. The current interrupting apparatus as recited in claim 1, wherein the triggering circuit includes a first resistor connected in series with the solenoid and in parallel with the fuse, the resistor having a resistance sufficient to prevent current flow through the solenoid during normal operation of the electrical circuit at current levels of a magnitude less than the first predetermined magnitude.

3. The current interrupting apparatus as recited in claim 2, wherein the triggering circuit includes a second resistor connected in parallel with the solenoid and in series with the first resistor for dividing the voltage across the solenoid.

4. The current interrupting apparatus as recited in claim 1, wherein the opening means for each current interrupter includes a shaft that is rotatable for causing opening of the contacts, the apparatus further including means for connecting the shafts of all of the interrupters together for unitary rotational movement so that when one of the shafts rotates to open the contacts of the respective interrupter, all of the shafts rotate to open the contacts of all of the interrupters.

5. A current interrupting apparatus adapted to be interposed in a multiple phase electrical circuit, the apparatus comprising:

a current limiting fuse interposed in each phase of the circuit and including a sealed housing and a fusible element within the housing which fuses in response to a fault current of a first predetermined magnitude experienced by the circuit, the housing including structure for retaining the energy of interruption with the housing upon fusing of the fusible element;

current interrupting means electrically connected in series with each current limiting fuse for interrupting the current through the circuit, each current interrupting means including a pair of normally closed electrical contacts and a mechanism for opening the contacts in response to a fault current of a second predetermined magnitude different from the first predetermined magnitude; and current interrupter triggering means for triggering operation of the mechanisms of all of the current interrupting means in response to fusing of the fusible element of any of the current limiting fuses to protect the circuit from the effects of single phasing, the current interrupter triggering means comprising a triggering circuit including a solenoid electrically connected in parallel with each of the current limiting fuses and means for operably connecting each solenoid to all of the mechanisms.

6. The current interrupting apparatus as recited in claim 5, wherein the triggering circuit includes a first resistor connected in series with the solenoid and in parallel with the current limiting fuse, the resistor having a resistance sufficient to prevent current flow through the solenoid during normal operation of the electrical circuit at current levels of a magnitude less than the first predetermined magnitude.

7. The current interrupting apparatus as recited in claim 6, wherein the triggering circuit includes a second resistor connected in parallel with the solenoid and in series with the first resistor for dividing the voltage across the solenoid.

8. The current interrupting apparatus as recited in claim 5, wherein the mechanism for opening the contacts of each current interrupting means includes a shaft that is rotatable for causing opening of the contacts, the apparatus further including means for connecting the shafts of all of the interrupting means together for unitary rotational movement so that when one of the shafts rotates to open the contacts of the respective interrupting means, all of the shafts rotate to open the contacts of all of the interrupting means.

9. A current interrupting apparatus adapted to be interposed in a single phase electrical circuit, the apparatus comprising:

a fuse interposed in the circuit and including a fusible element which fuses in response to a fault current of a first predetermined magnitude experienced by the circuit;

a current interrupter electrically connected in series with the fuse for interrupting the current through the circuit, the current interrupter including a pair of normally closed electrical contacts and opening means for moving the pair of contacts to an open position; and current interrupter triggering means for triggering operation of the opening means of the current interrupter in response to fusing of the fusible element of the fuse to protect the circuit from the effects of a fault current in the circuit, the current interrupter triggering means including a triggering circuit with a solenoid electrically connected in parallel with the fuse and operable upon fusing of the fusible element of the fuse to trigger operation of the opening means of the current interrupter.

10. A current interrupting apparatus adapted to be interposed in a multiple phase electrical circuit, the apparatus comprising:

a fuse interposed in each phase of the circuit and including a fusible element which fuses in response to a fault current of a first predetermined magnitude experienced by the circuit;

a current interrupter electrically connected in series with each fuse for interrupting the current through the circuit, each current interrupter including a pair of normally closed electrical contacts and opening means for moving the pair of contacts to an open position; and current interrupter triggering means for triggering operation of the opening means of all of the current interrupters in response to fusing of the fusible element of any of the fuses to protect the circuit from the effects of single phasing, the current interrupter triggering means including a triggering circuit with a solenoid electrically connected in parallel with each fuse and operable upon fusing of the fusible element of the fuse to trigger operation of the opening means of all of the current interrupters.

* * * * *